Figure 1:
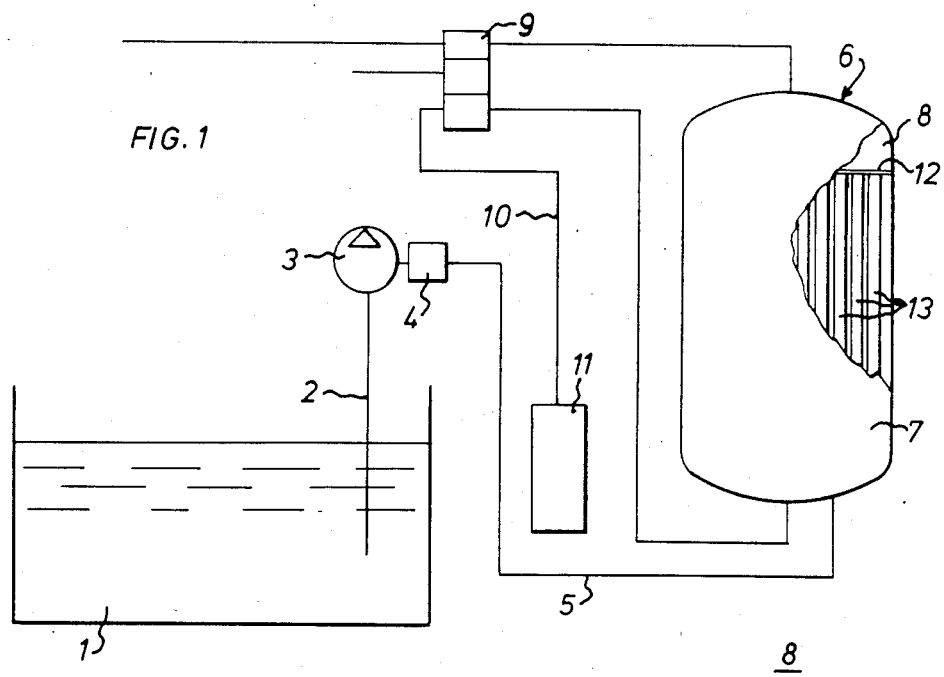

United States Patent [19]

Backman et al.

[11] Patent Number: 4,664,814

[45] Date of Patent: May 12, 1987

[54] METHOD AND INSTALLATION OF FILTRATION WITH COMPRESSIBLE DISCS

[76] Inventors: Sune Backman, 6, Yngvevägen, S-182 64 Djursholm; Hakan Hakanson, 54, Strå/kvägen, S-183 40 Täby, both of Sweden

[21] Appl. No.: 706,234

[22] Filed: Feb. 27, 1985

Related U.S. Application Data

[63] Continuation of Ser. No. 464,886, Feb. 8, 1983, abandoned.

[30] Foreign Application Priority Data

Feb. 25, 1982 [SE] Sweden ................. 8201179

[51] Int. Cl.⁴ ............... B01D 29/34; B01D 29/44
[52] U.S. Cl. .................... 210/780; 210/808; 210/350; 210/356; 210/357; 210/488
[58] Field of Search .............. 210/808, 137, 314, 350, 210/351, 352, 356, 357, 409, 411, 488, 489, 780

[56] References Cited

U.S. PATENT DOCUMENTS

| | | | |
|---|---|---|---|
| 2,591,056 | 4/1952 | Ericson | 210/356 |
| 2,773,602 | 12/1956 | Sylvester | 210/488 |
| 3,006,478 | 10/1961 | Mueller | 210/488 |
| 3,179,116 | 4/1965 | Jacobs | 210/356 |
| 3,214,368 | 10/1965 | Muller | 210/488 |
| 3,543,542 | 12/1970 | Bochan | 210/356 |
| 3,550,777 | 12/1970 | Singleton | 210/488 |
| 3,622,003 | 11/1971 | Czech | 210/356 |
| 4,093,548 | 6/1978 | Sterkenburg et al. | 210/350 |
| 4,361,489 | 11/1982 | Kilsdonk et al. | 210/350 |
| 4,430,232 | 2/1984 | Doucet | 210/351 |
| 4,435,287 | 3/1984 | Sumimoto | 210/350 |

FOREIGN PATENT DOCUMENTS

| | | | |
|---|---|---|---|
| 1343366 | 1/1963 | France . | |
| 626699 | 10/1961 | Italy | 210/323.2 |
| 198128 | 6/1938 | Switzerland . | |
| 211915 | 2/1941 | Switzerland . | |
| 226274 | 12/1924 | United Kingdom | 210/488 |
| 1000263 | 8/1965 | United Kingdom | 210/350 |

Primary Examiner—Richard V. Fisher
Assistant Examiner—Wanda L. Millard
Attorney, Agent, or Firm—Seidel, Gonda, Goldhammer & Abbott

[57] ABSTRACT

A filter assembly is formed by arranging a large number of substantially annular, thin filter elements disposed around a radially pervious and hollow core so that a major portion of the core is surrounded by the filter elements. Slots between the filter elements allow passage of the liquid to be filtered. The filter assembly is enclosed in a closed vessel with the interior of the core being in communication with an outlet line. An initial axial pressure is established on the filter elements by a spring which acts on an end support engaging the end one of the filter elements. The axial pressure on the filter elements is controlled by controlling pressure in the closed vessel and thus the size of the slots is controlled to establish the desired filtering degree of the filter assembly.

9 Claims, 2 Drawing Figures

U.S. Patent  May 12, 1987  4,664,814

METHOD AND INSTALLATION OF FILTRATION WITH COMPRESSIBLE DISCS

This application is a continuation of application Ser. No. 464,886, filed Feb. 8, 1983, now abandoned.

BACKGROUND OF THE INVENTION

The present invention relates to a method of arranging filters of the type comprising a large number of substantially annular, thin filter elements on a radially pervious and hollow core, thereby forming slots between adjacent elements to allow passage of the liquid to be filtered, and establishing a pressure difference between the space outside the filter elements and the space within the core to permit the liquid transport through the slots.

The invention also relates to an installation for carrying the method into effect, comprising a closed vessel and at least one filter assembly projecting into the vessel and consisting of a radially pervious or perforated and hollow core closed at one end and connected at the other end with a space situated outside the vessel, and annular thin filter elements on the core and disposed between end supports of which at least one is adjustable along the core.

In filters of the type referred to the filter elements often consist of paper or paper-like material and in such filters the application pressure between the filter elements is controlled by a screw means, a spring or the like which is tightened to a certain value. The liquid to be filtered is allowed to pass radially through the filter element pile, and the purified liquid can be collected on the remote side and the impurities remain on the opposite side. For cleaning of the filter, liquid is allowed to pass in the reverse direction. In conventional filters the compression of the filter elements cannot be pushed too far since these would thereby be permanently deformed, which would gradually alter the filtering capacity.

It has been found that the differential pressure can have a negative influence on the function of the filter because the pressure in a surrounding vessel will have a compressive effect on the filter pile whereby the application between the filter elements will be so heavy that the throughflow will be entirely interrupted under unfavorable conditions. It is interesting to note that the compression becomes self-increasing since, as the slots between the filter elements decrease, the throughflow decreases and the differential pressure increases. To remedy this it has been proposed in French Patent Specification No. 1,343,366 to provide a compression-preventing fluid chamber communicating with the space inside the filter elements and adapted to prevent the pressure in the surrounding vessel from acting upon the filter elements in a compressive sense. The spring-biased end plate engaging with the free end of the filter elements is balanced with the aid of the pressure of the outgoing fluid the pressure of which acts on both sides of the end plate which is displaceable like the piston in a cylinder. Therefore the known filter is not influenced by the differential pressure in the axial sense. The degree of compression is entirely controlled by the spring which pulls the lower end plate towards the fixed end plate at the outlet opening.

The present invention is based on the knowledge that the differential pressure can act upon the compression of the filter elements, and the object of the invention is to provide a means for utilizing this knowledge in order to adjust by a simple operation the filtration degree of the filter, i.e. vary the separating capacity of the filter upwards as well as downwards and permit filtration with separation of very small particles.

The essential characteristic of the method of the invention resides in: enclosing in a closed vessel the core surrounded by a plurality of annular filter elements; connecting the interior of the core with an outlet line or the like; establishing an initial application of axial pressure on the filter elements by a spring or other means which is adapted to act upon an end support engaging an end one of the filter elements; and adjusting the application of axial pressure on the filter elements to control the size of the slots to establish the desired filtering degree by adjusting the differential pressure, i.e. the difference between the higher pressure in the closed vessel and the pressure in the interior of the core, in such a way that the plurality of filter elements will be axially compressed.

The essential characteristic of the installation of the invention resides in a plurality of filter elements consisting of a material which is recurrently compressible and substantially incapable of absorbing the filtration liquid, which plurality of filter elements surround a pervious hollow core, a spring element adapted to act upon a displaceable end support engaging the end one of the filter elements to establish an initial axial pressure on the plurality of filter elements and a vessel containing the filter assembly of filter elements surrounding the pervious core. The vessel is in the form of a pressure vessel to permit variable pressure buildup across the filter assembly so that the size of the filter slots may be varied in response to the variation in axial compression of the filter elements.

Figure 2:
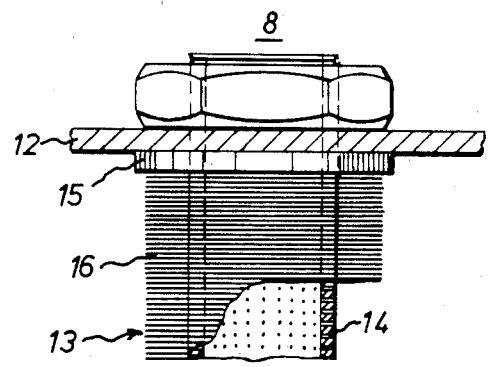
Figure 2:
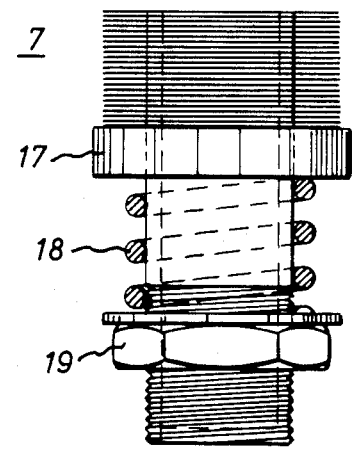

The invention will be described in more detail below with reference to the accompanying drawing in which:

FIG. 1 schematically illustrates the buildup of an installation adapted to the method of the invention; and FIG. 2 is a partially sectional view showing on a larger scale a filter in such an installation.

In the drawing, 1 designates a tank containing liquid to be filtered. A suction line 2 is coupled to a pump 3 provided with a pressure regulating means 4. The pressure line 5 of the pump leads to a pressure resistant vessel 6 in which the filter assemblies 13 are contained. The vessel has a partition dividing up the vessel into a section 7 for unfiltered liquid and a section 8 for filtered liquid. A conduit for filtered liquid leads from the section 8, via a control valve box 9, to the station of use or storage. Cleaning medium can be passed in a reverse direction the back way to the section 8 via the control valve box 9 to carry out back flushing of the filters. A conduit 10 for separated sludge extends from the vessel section 7 via the control valve box 9 to a sludge container 11.

A large number of filter assemblies 13 are attached to the partition 12 of the vessel 6. The filter assemblies each comprise a core 14 which is pervious or perforated adjacent to the partition 12 and is closed at the lower end. The interior of the respective core communicates with the space 8 situated above the partition 12. Provided adjacent the upper end of the core is an external flange or abutment surface 15. A large number of annular filter elements 16 surround the outside of the core. An end stop 17, which is displaceable relative to the core, bears against the lower end one of the filter elements and a compression spring 18 acting on the stop 17 is clamped against an abutment means 19 which is adjustable in the longitudinal direction of the core. The filter elements 16 are ring-shaped and consist of a thin material of such a nature that it will yield to compression but will resume its initial shape as the compression ceases. Thus the material is not permanently deformable but compressible to a certain extent. A plastics material would seem to be suitable whereas paper-based material, which must be considered predominant in the field of filters today, does not have the desired properties. Another essential requirement is that the material must not absorb liquid that makes it swell.

Since the pressure outside the filter is higher than the pressure in the interior of the core 14 the liquid during filtration will be carried through the slot-shaped interstices between the filter elements 16 and pass through the pores of the core 14 to exit through the interior of the core to the space 8 situated at the top. Impurities will remain on the outside of the filter elements and can be removed therefrom by back flushing, i.e. allowing pure liquid to pass in opposite direction through the slots.

The filter can be made adjustable to fit different particle sizes because the material used for making the filter elements is homogeneous and it substantially resumes its shape after compression.

Such an adjustment is obtained by regulation of the differential pressure, i.e. the pressure difference between the vessel space or section 7 and the pressure in the interior of the cores. The presence of a differential pressure is decisive for the function of the filter, which besides also applies to conventional paper filters.

The novelty resides in the feature that it is possible, due to the material used for the filter elements, to make the pressure in the vessel section 7 control the degree of compression of the filter elements, since the vessel pressure acts on the entire filter assembly and tends to axially compress the plurality of filter elements. The filter elements are not substantially compressible in the radial sense but are compressible in the axial sense. Therefore, an increase of the pressure in the vessel section 8 leads to an increased axial compression of the filter elements and consequently to a reduction of the "height" of the slots.

To enable a pressure-controlled regulation of the degree of compression of the filter elements it must first be possible to build up a differential pressure. As long as the filter elements are loosely applied on each other the vessel pressure cannot be utilized as indicated but first an initial compression must take place. This is effected by means of the spring 18 which acts against the displaceable end stop 17. By application of the spring the differential pressure is adjusted so as to be in the order of 2 kp/cm$^2$. The filter element pile offers such a high throughflow resistance that the pressure in the vessel space can be driven up to about 4–5 kp/cm$^2$ with the aid of the pump 3. By using a filter device in the indicated way it will be possible to filter off particles of a size as small as 0.25–0.50 microns and a further development would seem to make it quite possible to filter off even amoebae, for instance for the purification of drinking-water.

In addition to purification of drinking-water and of water from sewage treatment plants the filter installation can be utilized for the purification of technical water, e.g. sealing water for pumps and spray water for the paper and cellulose industry.

The invention should not be considered restricted to that described above and shown in the drawing but may be modified in various ways within the scope of the appended claims.

What we claim and desire to secure by Letters Patent is:

1. A method of controlling the size of material filtered from a liquid comprising the steps of:
    providing a filter assembly including a pressure vessel, a plurality of filter discs placed around a pervious hollow core, the core being located within the vessel, the filter discs being axially displaceable about the core, and the individual filter discs having an original height, and being resiliently compressible along the axis of the core;
    applying an initial axially compression to the filter discs;
    passing the liquid through the filter assembly;
    axially compressing the plurality of filter discs; and
    reducing the original height of the individual filter discs during the filter cycle;
    whereby the size of the materials filtered from the liquid is decreased as the compression of the plurality of filter discs increases.

2. The method according to claim 1 further comprising the step of:
    connecting the interior of the filter assembly with an outlet line.

3. The method according to claim 1 further comprising the step of:
    connecting the pressure vessel with an inlet line.

4. An apparatus for filtering a liquid in which the size of the material filtered is controlled which comprises:
    a pressure vessel which has an inlet;
    a hollow pervious core, an end of the core being an outlet;
    a plurality of filter elements which are stacked around the core, the elements being compressible along the axis of the core, the individual elements having an axial height, the filter elements being made of an elastic material, whereby the axial height is reduced by fluid pressure; and
    means for initially compressing the filter elements in the axial direction.

5. The apparatus according to claim 4 wherein the filter elements are annular and disc-shaped.

6. The apparatus according to claim 4 wherein the means for initially compressing comprises a spring means adapted to act upon one end of the plurality of filter elements.

7. The apparatus according to claim 4 wherein the filter elements are made of plastic.

8. The apparatus according to claim 4 wherein the filter elements are non-absorbent.

9. An apparatus for filtering a liquid in which the size of the material filtered is controlled, which comprises:
    a pressure vessel having an inlet;
    a hollow pervious core, one end of the core being closed and the other end being open, the open end being in communication with an outlet;
    a plurality of disc-shaped and annular filter elements which are stacked around the core, the elements being compressible along the axis of the core, the individual elements having an axial height, the elements being made of an elastic material, whereby the axial height is reduced by fluid pressure; and
    means for initially compressing the elements in the axial direction, the means for initially compressing includes a spring means adapted to act upon one end of the plurality of filter elements.

* * * * *